(12) United States Patent
Goto et al.

(10) Patent No.: US 7,826,115 B2
(45) Date of Patent: Nov. 2, 2010

(54) QUANTUM COMPUTING METHOD AND QUANTUM COMPUTER

(75) Inventors: Hayato Goto, Kawasaki (JP); Kouichi Ichimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/236,005

(22) Filed: Sep. 23, 2008

(65) Prior Publication Data
US 2009/0030962 A1 Jan. 29, 2009

Related U.S. Application Data

(62) Division of application No. 10/975,445, filed on Oct. 29, 2004, now Pat. No. 7,447,719.

(30) Foreign Application Priority Data
Oct. 31, 2003 (JP) ............................. 2003-372640

(51) Int. Cl.
*G02F 3/00* (2006.01)
(52) U.S. Cl. ........................................ 359/108; 708/191
(58) Field of Classification Search ................. 359/107, 359/108; 708/191
See application file for complete search history.

(56) References Cited

U.S. PATENT DOCUMENTS

| 6,671,710 | B2 | 12/2003 | Ovshinsky et al. |
| 6,800,837 | B1 | 10/2004 | Ichimura et al. |
| 7,126,106 | B2 | 10/2006 | Goto et al. |
| 7,359,101 | B2 | 4/2008 | Beausoleil et al. |
| 2004/0200950 | A1 * | 10/2004 | Beausoleil et al. ....... 250/214.1 |
| 2007/0145348 | A1 | 6/2007 | Ichimura et al. |
| 2008/0192315 | A1 | 8/2008 | Goto et al. |

OTHER PUBLICATIONS

T. Pellizzari, et al., "Decoherence Continuous Observation, and Quantum Computing: A Cavity QED Model", Physical Review Letters, vol. 75, No. 21, Nov. 20, 1995, pp. 3788-3791.
Jiannis Pachos, et al., "Quantum Computation with Trapped Ions in an Optical Cavity", Physical Review Letters, vol. 89, No. 18, Oct. 28, 2002, 4 pages.
V. Giovannetti, et al., "Scalable quantum computation with cavity QED systems", Physical Review A, vol. 62, Aug. 15, 2000, 11 pages.

(Continued)

*Primary Examiner*—Alessandro Amari
(74) *Attorney, Agent, or Firm*—Oblon, Spivak, McClelland, Maier & Neustadt, L.L.P.

(57) ABSTRACT

An (N+1) number of physical systems each having five energy levels $|0\rangle$, $|1\rangle$, $|2\rangle$, $|3\rangle$, and $|4\rangle$, a qubit being expressed by $|0\rangle$ and $|1\rangle$, are provided in an optical cavity having a cavity mode resonant with $|2\rangle$-$|3\rangle$, such that an N number of control systems and a target system are prepared. The target system is irradiated with light pulses resonant with $|0\rangle$-$|4\rangle$, $|1\rangle$-$|4\rangle$, and $|2\rangle$-$|4\rangle$ to change a superposed state $|c\rangle$ to $|2\rangle$. All of the physical systems are irradiated with light pulses resonant with $|0\rangle$-$|3\rangle$ and $|1\rangle$-$|3\rangle$, and a phase of the light pulse resonant with the target system is shifted by a specific value dependent on a unitary transformation U. The target system is irradiated with light pulses resonant with $|0\rangle$-$|4\rangle$, $|1\rangle$-$|4\rangle$, and $|2\rangle$-$|4\rangle$, with a phase difference between them being set to a specific value dependent on the unitary transformation U, to return $|2\rangle$ to $|c\rangle$.

4 Claims, 5 Drawing Sheets

OTHER PUBLICATIONS

M.A. Nielsen, et al., "Universal quantum gates", Quantum Computation and Quantum Information, 2000, pp. 188-193.

L. You, et al., "Quantum logic between atoms inside a high-Q optical cavity", Physical Review A, vol. 67, Mar. 25, 2003, 4 pages.

* cited by examiner

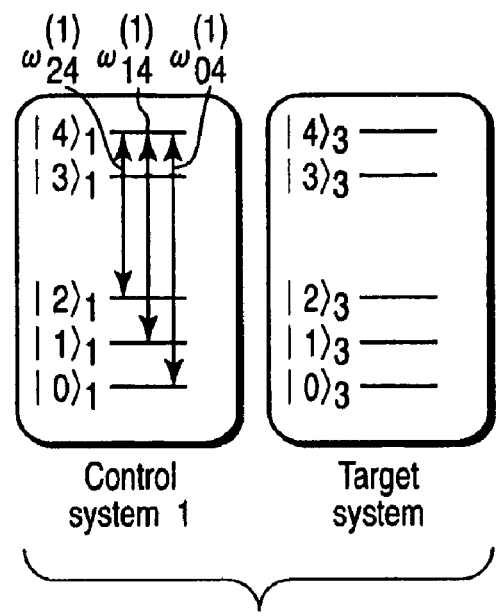
F I G. 4
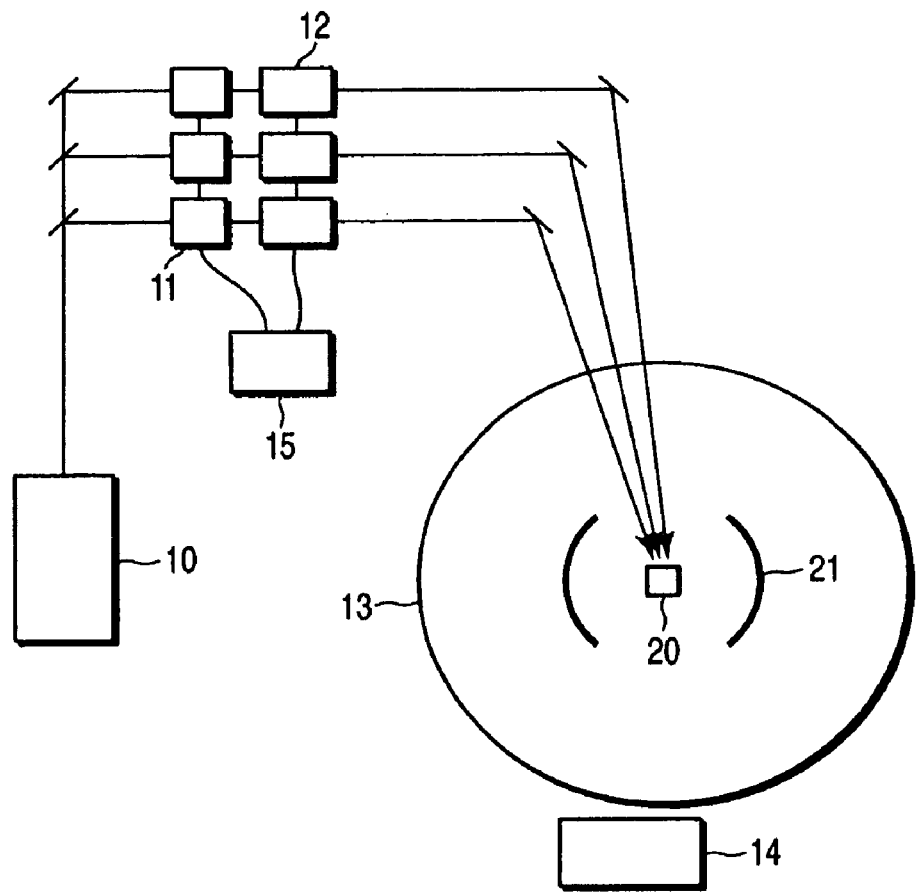
F I G. 5

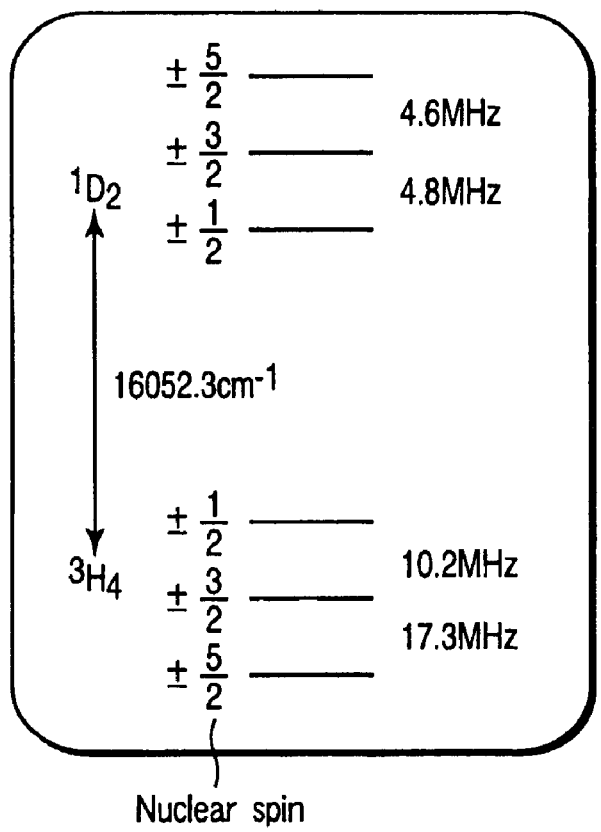
F I G. 6
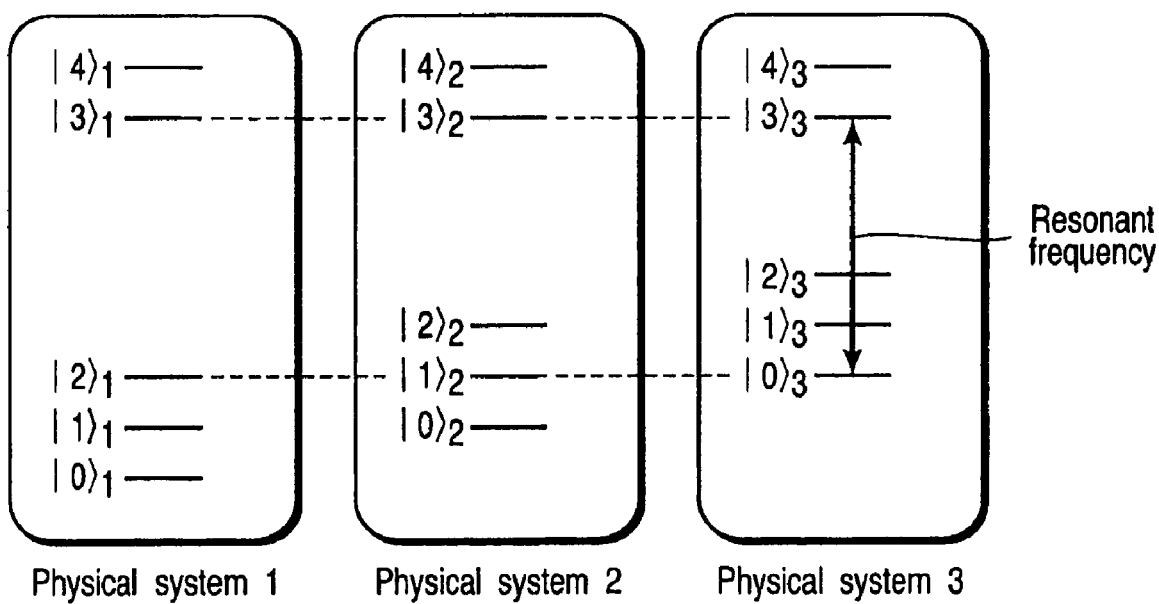
F I G. 7

US 7,826,115 B2

QUANTUM COMPUTING METHOD AND QUANTUM COMPUTER

CROSS-REFERENCE TO RELATED APPLICATIONS

This application is a Divisional of and claims the benefit of priority from U.S. Ser. No. 10/975,445, filed Oct. 29, 2004, and claims the benefit of priority from Japanese Patent Application No. 2003-372640, filed Oct. 31, 2003, the entire contents of each which are incorporated herein by reference.

BACKGROUND OF THE INVENTION

1. Field of the Invention

This invention relates to a quantum computing method and a quantum computer using light.

2. Description of the Related Art

In recent years, tremendous research effort has been directed toward quantum computers, which execute calculations on the basis of the principle of quantum mechanics. In quantum computers, two quantum states, $|0\rangle$ and $|1\rangle$, form the basis of information. The two states correspond to bit 0 and bit 1, which form the basis of information in present-day computers. In quantum computers, however, the two quantum states are called quantum bits (qubits) to distinguish them from bits in present-day computers, since superposition states, such as $\alpha|0\rangle + \beta|1\rangle$ ($\alpha$ and $\beta$ are complex numbers), are used in the computing process.

It is known that any calculation can be executed by combining 1-qubit gates, each of which transforms one qubit, with 2-qubit gates, each of which transforms one of two qubits depending on the other. It is further known that a controlled-NOT (CNOT) gate, which leaves the latter qubit unchanged if the former qubit is $|0\rangle$ and exchanges $|0\rangle$ and $|1\rangle$ of the latter qubit if the former qubit is $|1\rangle$, suffices for any calculation together with 1-qubit gates (M. A. Nielsen and I. L. Chuang, Quantum Information and Computation, Cambridge Univ. Press, 2000). These elementary gates are called universal gates. Use of universal gates enables any calculation to be executed. An attempt to realize a gate acting on three qubits or more (e.g., a quantum Toffoli gate, which is a 3-qubit gate and exchanges $|0\rangle$ and $|1\rangle$ of the one qubit only when the other two qubits are $|1\rangle|1\rangle$) by combining universal gates requires many gates and, therefore, the operation becomes complicated. To realize an actual quantum algorithm using many gates acting on three qubits or more, such as Shor's algorithm for prime factoring or Grover's algorithm for database searching, it is desirable that the gates acting on three qubits or more can be executed without decomposing into the universal gates.

Up to the present time, many methods of realizing 2-qubit gates have been presented. Pellizzari's method is known as the first one of the methods of executing a 2-qubit gate by connecting separate physical systems with an optical cavity (T. Pellizzari, S. A. Gardiner, J. I. Cirac, and P. Zoller, Phys. Rev. Lett. 75, 3788, 1995). Each of the physical systems used in the method is a three-level system having three energy levels each of which is doubly degenerate. A qubit is represented by degenerate two states of one of the two lower levels. The transition between the remaining one of the two lower levels and the upper level is resonant with the cavity mode. Since this method uses degenerate levels, when the user wants to operate the degenerate two states separately, the following problem arises: the user has to split the states by applying a magnetic field or an electric field in order to distinguish them in energy or use an optical selection rule unique to the materials used for the physical systems. Some methods of using a cavity without such a problem have been proposed (e.g., L. You, X. Y. Yi, and X. H. Su, Phys. Rev. A67, 032308, 2003). However, all of the conventional methods, including Pellizzari's method, relate to a 2-qubit gate, and a quantum computing method using a cavity which executes a gate acting on three qubits or more has not been proposed yet.

BRIEF SUMMARY OF THE INVENTION

An object of the present invention is to provide a quantum computing method which uses an optical cavity and is capable of executing multiqubit gates, including 2-qubit gates, and a quantum computer realizing the quantum computing method.

According to an aspect of the present invention, there is provided a quantum computing method capable of executing multiqubit-controlled unitary gates, in each of which a unitary transformation U is performed to a single target bit depending on an N number of control bits (N is a natural number), the quantum computing method comprising:

providing an (N+1) number of physical systems in an optical cavity, each of the (N+1) number of physical systems having five energy levels $|0\rangle$, $|1\rangle$, $|2\rangle$, $|3\rangle$, and $|4\rangle$, a qubit being expressed by two levels, $|0\rangle$ and $|1\rangle$, of the three lower levels, transitions between each of the three lower levels $|0\rangle$, $|1\rangle$, and $|2\rangle$ and each of the two upper levels $|3\rangle$ and $|4\rangle$ being optically allowed, and a transition frequency between two levels $|2\rangle$ and $|3\rangle$ in each of the physical systems being equal to one another, the optical cavity having a cavity mode resonant with the transition frequency between two levels $|2\rangle$ and $|3\rangle$, such that an N number of physical systems among the (N+1) number of physical systems are used as an N number of control systems and the one other physical system as a target system;

irradiating the target system with light pulses resonant with the transitions between $|0\rangle$ and $|4\rangle$, between $|1\rangle$ and $|4\rangle$, and between $|2\rangle$ and $|4\rangle$ so as to change a superposed state, $|c\rangle$, of $|0\rangle$ and $|1\rangle$ dependent on the unitary transformation U to the state $|2\rangle$ in the target system;

irradiating all of the (N+1) number of systems with light pulses resonant with the transitions between $|0\rangle$ and $|3\rangle$, and between $|1\rangle$ and $|3\rangle$, and shifting a phase of the light pulse resonant with the target system by a specific value dependent on the unitary transformation U while the control systems are irradiated with the resonant light pulses; and irradiating the target system with light pulses resonant with the transitions between $|0\rangle$ and $|4\rangle$, between $|1\rangle$ and $|4\rangle$, and between $|2\rangle$ and $|4\rangle$, with a phase difference between them being set to a specific value dependent on the unitary transformation U, so as to return the state $|2\rangle$ to the state $|c\rangle$.

According to another aspect of the present invention, there is provided a quantum computer comprising:

an (N+1) number of physical systems each of which has five energy levels $|0\rangle$, $|1\rangle$, $|2\rangle$, $|3\rangle$, and $|4\rangle$, a qubit being expressed by two levels, $|0\rangle$ and $|1\rangle$, of the three lower levels, transitions between each of the three lower levels $|0\rangle$, $|1\rangle$, and $|2\rangle$ and each of the two upper levels $|3\rangle$ and $|4\rangle$ being optically allowed, and a transition frequency between two levels $|2\rangle$ and $|3\rangle$ in each of the physical systems being equal to one another;

an optical cavity which has the physical systems arranged therein and is resonant with the transition frequency between the two levels $|2\rangle$ and $|3\rangle$;

frequency and amplitude modulators which generate light pulses resonant with the transitions between each of the three lower levels |0>, |1>, and |2> and each of the two upper levels |3> and |4> in each of the physical systems;

phase modulators which control the phases of the light pulses; and a control unit which operates the frequency and amplitude modulators and the phase modulators in synchronization with one another.

BRIEF DESCRIPTION OF THE SEVERAL VIEWS OF THE DRAWING

FIG. 4 is a schematic view showing light applied in executing a 1-qubit gate for the control bit 1 to adjust a phase when a C-U gate is executed;

FIG. 5 is a schematic view showing the configuration of the quantum computer used in the first embodiment of the present invention;

FIG. 6 is a schematic view showing the energy levels of a $Pr^{3+}$ ion in a $Pr^{3+}:Y_2SiO_5$ crystal;

FIG. 7 is a schematic view showing the energy levels of three $Pr^{3+}$ ions used to realize the quantum Toffoli gate in the first embodiment;

DETAILED DESCRIPTION OF THE INVENTION

The present invention will be described in detail hereinafter.

A control system means a physical system used to store control bits and a target system means a physical system used to store a target bit herein. For simplicity, two physical systems are used as control systems and another physical system is used as a target system. The way of realizing a multiqubit-controlled unitary gate (hereinafter, referred to as an M-C-U gate), which performs a unitary transformation U to the target bit depending on control bits, will be described. As described later, this method is easily generalized to the case when the number of control bits is N (N is a natural number other than 2).

Hereinafter, "when a qubit is |d>, an operation is performed" means that, "when the state used to represent a qubit is expressed by a superposition of |d> and the state |c> orthogonal to |d>, an operation is performed to a state including |d> among the superposed states."

Figure 1:
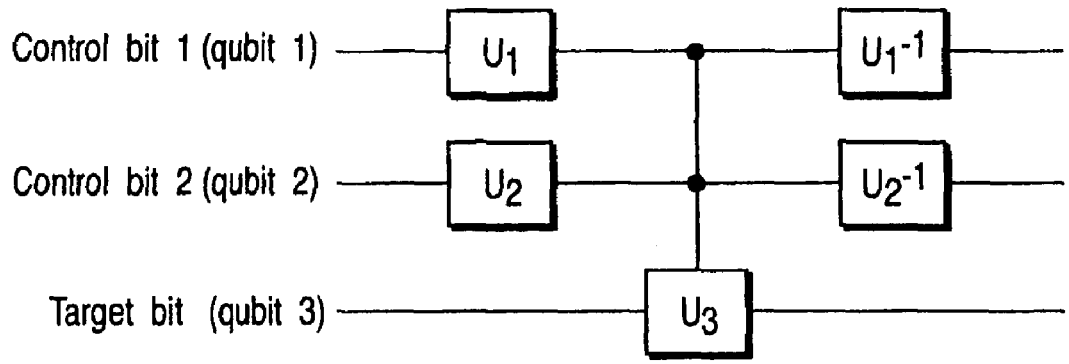
FIG. 1 is a quantum circuit diagram according to an embodiment of the present invention.

FIG. 1 is a quantum circuit diagram of the M-C-U gate described below. As shown in FIG. 1, let two control bits be qubit 1 and qubit 2, a target bit be qubit 3, two control systems be physical system 1 and physical system 2, and a target system be physical system 3. Only when the control bits are $|d<_1=U_1^{-1}|1>_1$ and $|d<_2=U_2^{-1}|1>_2$, respectively, a unitary transformation $U_3$ is performed to a target bit. In FIG. 1, since qubit 3 is used as a target bit, the unitary transformation U is denoted by $U_3$. In this case, "the base used to express the condition for control bit k" in the M-C-U gate means a set of the state $|d>_k$ and the state $|c>_k$ orthogonal to $|d>_k$, or $\{|d>_k, |c>_k\}$.

A special instance of this case is a quantum Toffoli gate, which exchanges $|0>_3$ and $|1>_3$ in the target bit, only when the control bits are $|1>_1$ and $|1>_2$, respectively. The quantum Toffoli gate is a very important gate frequently used in the quantum algorithm for prime factoring found by Shor (V. Verdral, A. Barenco, and A. Ekert, Phys. Rev. A54, 147, 1996).

Three unitary transformations are generally expressed as follows (any unitary transformation can be expressed by the equations in the following form):

$$|c\rangle_k = \cos\frac{\theta_k}{2}|0\rangle_k + e^{i\varphi_k}\sin\frac{\theta_k}{2}|1\rangle_k,$$

$$|d\rangle_k = \sin\frac{\theta_k}{2}|0\rangle_k - e^{i\varphi_k}\cos\frac{\theta_k}{2}|1\rangle_k$$

$$(k = 1, 2, 3)$$

$$U_1 = e^{i\Theta_1}(|0\rangle_{11}\langle c| + e^{i\phi_1}|1\rangle_{11}\langle d|),$$

$$U_2 = e^{i\Theta_2}(|0\rangle_{22}\langle c| + e^{i\phi_2}|1\rangle_{22}\langle d|),$$

$$U_3 = e^{i\Theta_3}\left\{I^{(3)}\cos\frac{\phi_3}{2} - i\sin\frac{\phi_3}{2}(\sigma_x^{(3)}\cos\varphi_3\sin\theta_3 + \sigma_y^{(3)}\sin\varphi_3\sin\theta_3 + \sigma_z^{(3)}\cos\theta_3)\right\}$$

$$= e^{i(\Theta_3+\phi_3/2)}(|d\rangle_{33}\langle d| + e^{-i\phi_3}|c\rangle_{33}\langle c|)$$

where $I^{(3)}$, $\sigma_x^{(3)}$, $\sigma_y^{(3)}$, $\sigma_z^{(3)}$ are an identity operator and Pauli operators on qubit 3 and are defined by the following equations:

$$I^{(3)} \equiv |0\rangle_{33}\langle 0| + |1\rangle_{33}\langle 1|, \sigma_x^{(3)} \equiv |1\rangle_{33}\langle 0| + |0\rangle_{33}\langle 1|,$$

$$\sigma_y^{(3)} \equiv -i|1\rangle_{33}\langle 0| + i|0\rangle_{33}\langle 1|, \sigma_z^{(3)} \equiv |0\rangle_{33}\langle 0| - |1\rangle_{33}\langle 1|$$

Let the phase factor of $U_k$ (k=1, 2) be $\Theta_k=\phi_k=0$ (k=1, 2), since it can be neglected because of a unitary transformation $U_k^{-1}$ performed later.

Figure 2:
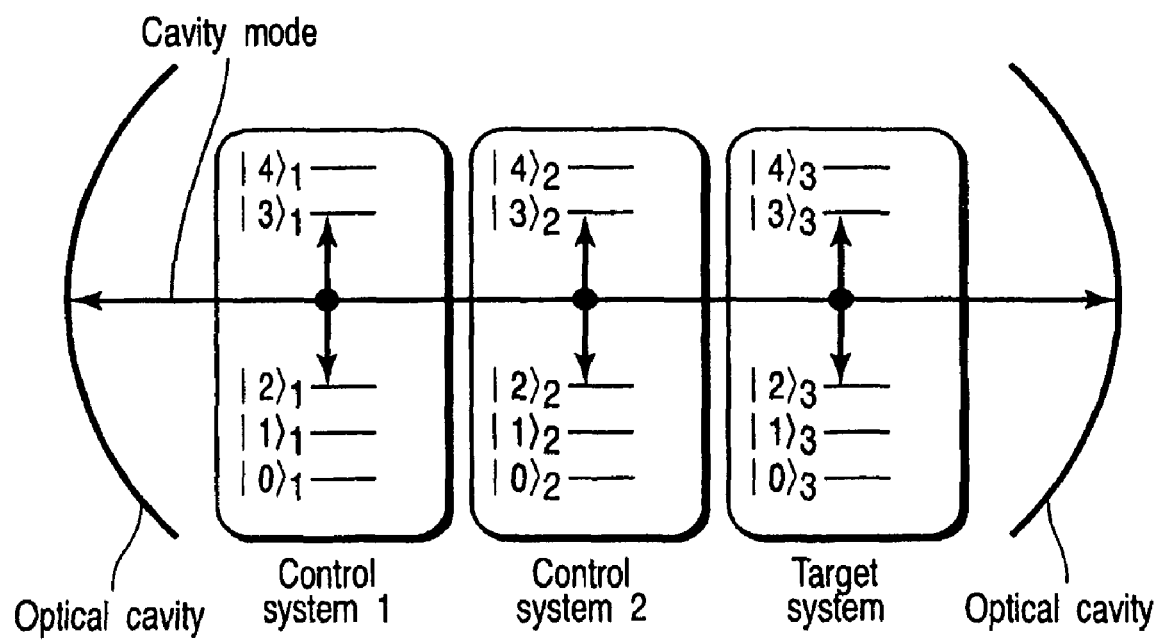
FIG. 2 is a schematic view showing energy levels in three physical systems and an optical cavity including them and a cavity mode.
Figure 3:
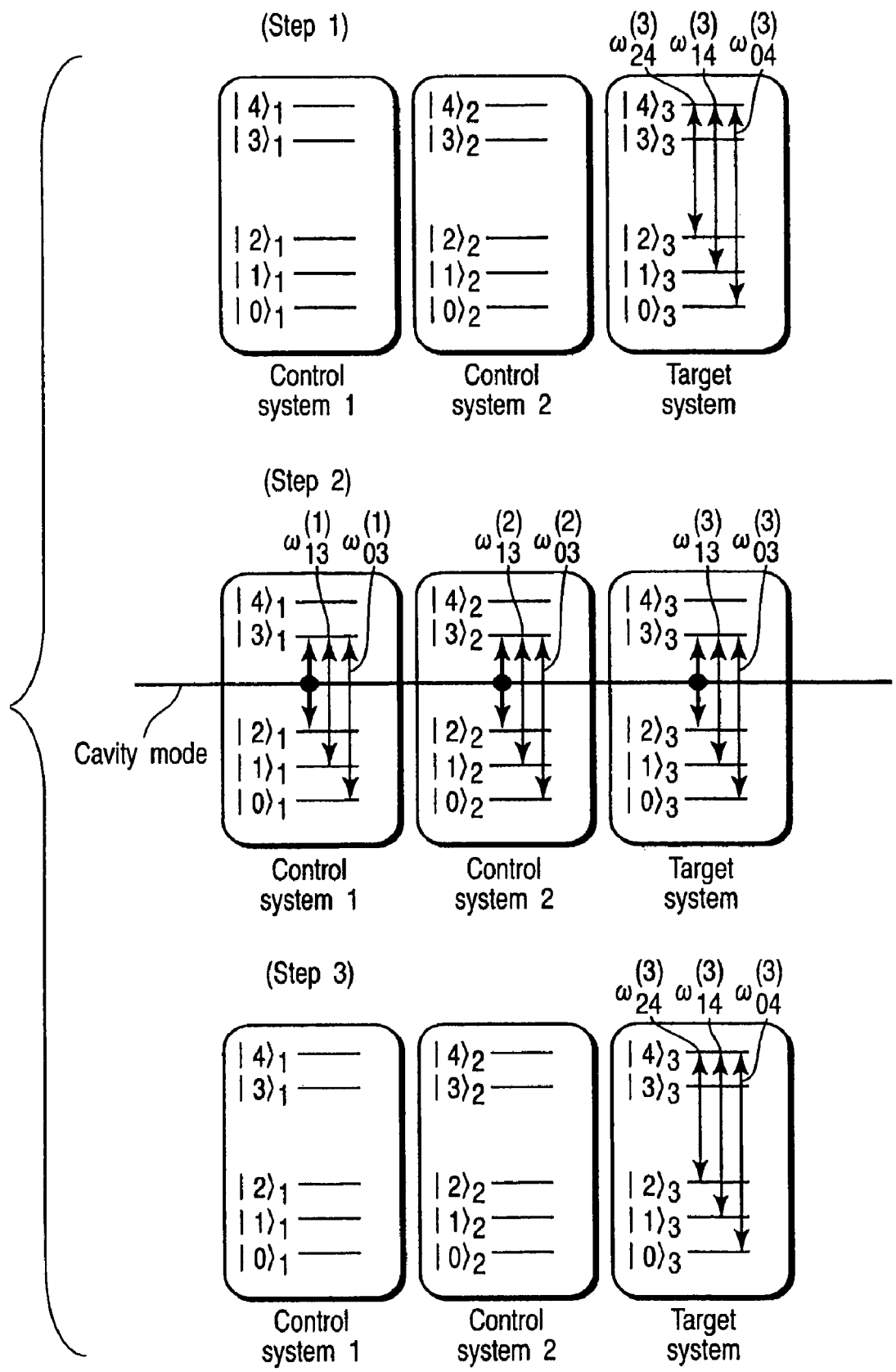
FIG. 3 is a schematic view showing light applied in three steps of executing an M-C-U gate.

FIG. 2 is a schematic view showing energy levels in the three physical systems and an optical cavity including them and a cavity mode. The states of physical system k (k=1, 2, 3) are denoted by $|0>_k$, $|1>_k$, $|2>_k$, $|3>_k$ and $|4>_k$ in ascending order of energy. A qubit is expressed by $|0>_k$ and $|1>_k$. Suppose the states of all the physical systems are expressed by $|0>_k$ and $|1>_k$ before any gate operation. The transitions between the states $|2>_k$ and $|3>_k$ (k=1, 2, 3) are resonant with the cavity mode. The M-C-U gate is realized by three steps described below. FIG. 3 is a schematic view showing light applied in each of the steps.

The initial state $|\Psi_0>_k$ is expressed as follows, using $|d>_k$, $|c>_k$ (k=1, 2, 3), and the state of cavity photons:

$$|\psi_0\rangle = \sum_{l,m,n=d,c} \alpha_{lmn}|lmn\rangle|0\rangle,$$

where $|lmn> \equiv |l>_1|m>_2|n>_3$ and |0> is the state in which the number of cavity photons is zero (i.e., vacuum).

(Step 1)

As shown in FIG. 3 (step 1), first, the target system is irradiated with light pulses resonant with the transitions between $|0>_3$ and $|4>_3$, between $|1>_3$ and $|4>_3$, and between $|2>_3$ and $|4>_3$. Qubits are distinguished with one another by their positions or transition frequencies. Let the frequencies of the light pulses be $\omega_{04}^{(3)}$, $\omega_{14}^{(3)}$, and $\omega_{24}^{(3)}$ respectively. The electric field of the light pulse train acing on the physical system 3 (target system) is expressed by the following equation:

$$E(t) = \sum_{l=0,1,2} E_l^{(3)}(t)\exp[-i\omega_{l4}^{(3)}t] + c.c.$$

(c.c.: complex conjugate).
The envelopes are given by the following equations:

$$E_0^{(3)} = A^{(3)}\cos\frac{\theta_3}{2}f_c(t),$$

$$E_1^{(3)} = A^{(3)}e^{-i\varphi_3}\sin\frac{\theta_3}{2}f_c(t),$$

$$E_2^{(3)} = A^{(3)}f_2(t),$$

where $A^{(3)}$ is a constant and $f_c(t)$ and $f_2(t)$ represent pulse waveforms and are given by the following equations:

$$f_c(t) = \exp\left[-\frac{(t-\tau-t_0)^2}{\tau^2}\right],$$

$$f_2(t) = \exp\left[-\frac{(t-t_0)^2}{\tau^2}\right].$$

In the above equation, $2\tau$ is the pulse width and $t_0$ is a positive constant for making the electric field zero at time 0. The pulse interval is set to a half of the pulse width because then a physical process known as adiabatic passage described below can be carried out efficiently. A specific example of the light pulse train will be described later (see FIG. 8 in the first embodiment).

The interaction Hamiltonian in interaction representation is expressed by the following equation under rotating-wave approximation:

$$H = \sum_{l=c,2}\hbar\Omega_l^{(3)}(t)|4\rangle_{33}\langle l| + \sum_{k=1,2,3}\hbar g a|3\rangle_{kk}\langle 2| + H.c.$$

(H.c. is Hermitian conjugate),
where $$\Omega_l^{(3)}(t) = \frac{dA^{(3)}}{\hbar}f_l(t)$$

is the Rabi frequency (d is a transition dipole moment), g is a coupling constant between the physical system and the cavity mode, a is an annihilation operator for cavity photons.

An eigenstate corresponding to the Hamiltonian zero eigenvalue is called a dark state. The dark states for the above Hamiltonian which are related to the initial state are $|1\rangle_1|m\rangle_2|d\rangle_3|0\rangle$ and $|1\rangle_1|m\rangle_2(\Omega_2^{(3)}(t)|c\rangle_3-\omega_c^{(3)}(t)|2\rangle_3)|0\rangle$ (l, m=0, 1). When the changes of the Rabi frequencies are sufficiently slow, the state $|c\rangle_3$ in the initial state is changed by the above light pulse train according to the change of the dark state. The remaining states do not change. Since the dark state is $|c\rangle_3$ when the light pulses resonant with $|2\rangle_3$ start to be applied, $|c\rangle_3$ does not change. Since the dark state is the superposition of $|c\rangle_3$ and $|2\rangle_3$ while the light pulses resonant with the state $|c\rangle_3$ are applied, $|c\rangle_3$ in the initial state also changes to the same superposition state. When the application of the light pulse train is completed, $|c\rangle_3$ eventually becomes $-|2\rangle_3$ as a result of the change of the dark state. Such a phenomenon that the state changes through dark states as described above is called "adiabatic passage" (K. Bergmann, H. Theuer, and B. W. Shore, Rev. Mod. Phys. 70, 1003, 1998). The state after the adiabatic passage is as follows:

$$|\Psi_1\rangle = (\alpha_{ddd}|ddd\rangle - \alpha_{ddc}|dd2\rangle + \alpha_{dcd}|dcd\rangle - \alpha_{dcc}|dc2\rangle + \alpha_{cdd}|cdd\rangle - \alpha_{cdc}|cd2\rangle + \alpha_{ccd}|ccd\rangle - \alpha_{ccc}|cc2\rangle)|0\rangle.$$

(Step 2)
Next, adiabatic passage is performed using a cavity effect. As shown in FIG. 3 (step 2), the physical systems are irradiated with light pulse trains resonant with the transitions between $|0\rangle_1$ and $|3\rangle_1$, between $|1\rangle_1$ and $|3\rangle_1$, between $|0\rangle_2$ and $|3\rangle_2$, between $|1\rangle_2$ and $|3\rangle_2$, between $|0\rangle_3$ and $|3\rangle_3$, and between $|1\rangle_3$ and $|3\rangle_3$. Let the frequencies of the light pulse trains be $\omega_{03}^{(1)}$, $\omega_{13}^{(1)}$, $\omega_{03}^{(2)}$, $\omega_{13}^{(2)}$, $\omega_{03}^{(3)}$, and $\omega_{13}^{(3)}$, respectively. The electric field $E'^{(k)}(t)$ of the pulse train acting on physical system k (k=1, 2, 3) is expressed by the following equation:

$$E'^{(k)}(t) = \sum_{l=0,1} E_l'^{(k)}(t)\exp[-i\omega_{l3}^{(k)}t] + c.c..$$

The envelopes are given by the following equations:

$$E_0'^{(1)}(t) = A'^{(1)}\cos\frac{\theta_1}{2}f^{(1)}(t),$$

$$E_1'^{(1)}(t) = A'^{(1)}e^{-i\varphi_1}\sin\frac{\theta_1}{2}f^{(1)}(t),$$

$$E_0'^{(2)}(t) = A'^{(2)}\cos\frac{\theta_2}{2}f^2(t),$$

$$E_1'^{(2)}(t) = A'^{(2)}e^{-i\varphi_2}\sin\frac{\theta_2}{2}f^2(t),$$

$$E_0'^{(3)}(t) = A'^{(3)}\cos\frac{\theta_3}{2}[f_1^{(3)}(t) + e^{i\phi_3}f_2^{(3)}(t)],$$

$$E_1'^{(3)}(t) = A'^{(3)}e^{-i\varphi_3}\sin\frac{\theta_3}{2}[f_1^{(3)}(t) + e^{i\phi_3}f_2^{(3)}(t)],$$

where $A'^{(k)}$ (k=1, 2, 3) is a constant and the pulse waveforms are given by the following equations:

$$f^{(1)}(t) = f^{(2)}(t)$$
$$= \exp\left[-\frac{(t-8\tau-t_0)^2}{\tau^2}\right] + \exp\left[-\frac{(t-12\tau-t_0)^2}{\tau^2}\right],$$

$$f_1^{(3)}(t) = \exp\left[-\frac{(t-7\tau-t_0)^2}{\tau^2}\right],$$

$$f_2^{(3)}(t) = \exp\left[-\frac{(t-13\tau-t_0)^2}{\tau^2}\right]$$

To prevent the pulses in step 2 from overlapping with those in step 1, the adjacent pulses in step 1 and step 2 are set, for example, $6\tau$ away from each other. In addition, $f_1^{(3)}(t)$ and $f_2^{(3)}(t)$ are set $6\tau$ away from each other to prevent them from overlapping with each other. Hereinafter, pulses to be separated are set 6τ away from each other. The interaction Hamiltonian is expressed by the following equation:

$$H' = \sum_{k=1,2,3} \hbar(\Omega_c'^{(k)}(t)|3\rangle_{kk}\langle c| + ga|3\rangle_{kk}\langle 2|) + H.c.,$$

where the Rabi frequencies are $$\Omega_c'^{(k)}(t) = \frac{dA'^{(k)}}{\hbar} f^{(k)}(t) \quad (k=1,2) \text{ and}$$

$$\Omega_c'^{(3)}(t) = \frac{dA'^{(3)}}{\hbar}[f_1^{(3)}(t) + e^{i\phi_3} f_2^{(3)}(t)].$$

The dark states related to the change of the state are expressed by the following equations:

$$|D_1\rangle = |ddd\rangle|0\rangle,$$

$$|D_2\rangle = |dd2\rangle|0\rangle,$$

$$|D_3(t)\rangle \propto g|cdd\rangle|0\rangle - \Omega_c'^{(1)}(t)|2dd\rangle|1\rangle,$$

$$|D_4(t)\rangle \propto g|dcd\rangle|0\rangle - \Omega_c'^{(2)}(t)|d2d\rangle|1\rangle,$$

$$|D_5(t)\rangle \propto \sqrt{2}\, g^2|ccd\rangle|0\rangle -$$
$$\sqrt{2}\, g(\Omega_c'^{(1)}(t)|2cd\rangle + \Omega_c'^{(2)}(t)|c2d\rangle)|1\rangle + \Omega_c'^{(1)}(t)\Omega_c'^{(2)}(t)|22d\rangle|2\rangle,$$

$$|D_6(t)\rangle \propto g(\Omega_c'^{(3)}(t)|dc2\rangle + \Omega_c'^{(2)}(t)|d2c\rangle)|0\rangle - \Omega_c'^{(2)}(t)\Omega_c'^{(3)}(t)|d22\rangle|1\rangle,$$

$$|D_7(t)\rangle \propto g(\Omega_c'^{(3)}(t)|cd2\rangle + \Omega_c'^{(1)}(t)|2dc\rangle)|0\rangle - \Omega_c'^{(1)}(t)\Omega_c'^{(3)}(t)|2d2\rangle|1\rangle,$$

$$|D_8(t)\rangle \propto \sqrt{2}\, g^2(\Omega_c'^{(3)}(t)|cc2\rangle + \Omega_c'^{(1)}(t)|2cc\rangle + \Omega_c'^{(2)}(t)|c2c\rangle)|0\rangle -$$
$$\sqrt{2}\, g(\Omega_c'^{(1)}(t)\Omega_c'^{(2)}(t)|22c\rangle + \Omega_c'^{(1)}(t)\Omega_c'^{(3)}(t)|2c2\rangle + \Omega_c'^{(2)}(t)\Omega_c'^{(3)}(t)|c22\rangle)$$
$$|1\rangle + \Omega_c'^{(1)}(t)\Omega_c'^{(2)}(t)\Omega_c'^{(3)}(t)|222\rangle|2\rangle$$

Since the phase of $\omega_c'^{(3)}$ is shifted by $\phi_3$ in the adiabatic passage by the above light pulse trains, the state is changed as follows:

$$|\psi_2\rangle = (\alpha_{ddd}|ddd\rangle - \alpha_{ddc}|dd2\rangle + \alpha_{dcd}|dcd\rangle - \alpha_{dcc}e^{i\phi_3}|dc2\rangle +$$
$$\alpha_{cdd}|cdd\rangle - \alpha_{cdc}e^{i\phi_3}|cd2\rangle + \alpha_{ccd}|ccd\rangle - \alpha_{ccc}e^{i\phi_3}|cc2\rangle)|0\rangle$$

(Step 3)

As shown in FIG. 3 (step 3), the reverse operation to the adiabatic passage in step 1 is performed to return the state $-|2\rangle_3$ to $e^{-i\phi_3}|c\rangle_3$. What differs from step 1 is that the envelopes and the light pulse waveforms are expressed as follows. Here, the constant $A^{(3)}$ need not be the same as that in step 1.

$$E_0^{(3)} = A^{(3)}\cos\frac{\theta_3}{2} f_c(t),$$

$$E_1^{(3)} = A^{(3)} e^{-i\varphi_3}\sin\frac{\theta_3}{2} f_c(t),$$

$$E_2^{(3)} = A^{(3)} e^{-i\phi_3} f_2(t),$$

$$f_c(t) = \exp\left[-\frac{(t-19\tau-t_0)^2}{\tau^2}\right],$$

$$f_2(t) = \exp\left[-\frac{(t-20\tau-t_0)^2}{\tau^2}\right].$$

The state becomes $$|\Psi_3\rangle = (\alpha_{ddd}|ddd\rangle - \alpha_{ddc}e^{-i\phi_3}|ddc\rangle + \alpha_{dcd}|dcd\rangle + \alpha_{dcc}|dcc\rangle + \alpha_{cdd}|cdd\rangle + \alpha_{cdc}|cdc\rangle + \alpha_{ccd}|ccd\rangle + \alpha_{ccc}|ccc\rangle)|0\rangle.$$

This can be expressed with an operator P on the initial state as follows:

$$|\psi_3\rangle = P|\psi_0\rangle,$$

$$P = (I^{(1)} \otimes I^{(2)} - |d\rangle_{11}\langle d| \otimes |d\rangle_{22}\langle d|) \otimes I^{(3)} +$$
$$|d\rangle_{11}\langle d| \otimes |d\rangle_{22}\langle d| \otimes (|d\rangle_{33}\langle d| + e^{-i\phi_3}|c\rangle_{33}\langle c|)$$

Using the equation $$|d\rangle_{33}\langle d| + e^{-i\phi_3}|c\rangle_{33}\langle c| = e^{-i(\Theta_3+\phi_3/2)}U_3,$$

the operator P is expressed by the following equation:

$$P = (I^{(1)} \otimes I^{(2)} - |d\rangle_{11}\langle d| \otimes |d\rangle_{22}\langle d|) \otimes I^{(3)} +$$
$$e^{-i(\Theta_3+\phi_3/2)}|d\rangle_{11}\langle d| \otimes |d\rangle_{22}\langle d| \otimes U_3.$$

This equation means that the target bit is multiplied by $e^{-i(\Theta_3+\phi_3/2)}U_3$ only when two control bits are $|d\rangle_1 = U_1^{-1}|1\rangle_1$ and $|d\rangle_2 = U_2^{-1}|1\rangle_2$, respectively. Consequently, the desired M-C-U gate is realized, except for a phase factor. In the case of $\Theta_3 + \phi_3/2 = 0$, the M-C-U gate can be executed properly, including the phase. A quantum Toffoli gate, one of the most important M-C-U gates, can be executed properly including the phase, provided that the values of the parameters are set to $\phi_3 = \Pi$, $\phi_1 = \phi_2 = \phi_3 = \Pi$, $\theta_1 = \theta_2 = 0$, $\theta_3 = \Pi/2$, $\Theta_3 = -\Pi/2$, where the equation $\Theta_3 + \phi_3/2 = 0$ is satisfied.

Next, the case of a C-U gate with one control bit will be described. Suppose that only the control bit 1 and the target bit are used but the control bit 2 is not used. In this case, while the operation of $-|2\rangle_3 \to e^{-i\phi_3}|c\rangle_3$ is performed in step 3, 1-qubit gate of $|d\rangle_1 \to e^{i[\Theta_3+\phi_3/2]}|d\rangle_1$ is executed on the control bit 1, where $|c\rangle_1$ remains unchanged. This 1-qubit gate makes it possible to execute the C-U gate always properly including the phase. It is known that a 1-qubit gate is realized by adiabatic passage using light pulses resonant with the transitions between the three lower levels $|0\rangle_k, |1\rangle_k, |2\rangle_k$ and the upper level $|4\rangle_k$ (Z. Kis and F. Renzoni, Phys. Rev. A 65, 032318, 2002). Using this method, $|d\rangle_1 \to e^{i[\Theta_3+\phi_3/2]}|d\rangle_1$ is executed through the adiabatic passage. Similarly, any 1-qubit gate can be realized by adiabatic passage using light pulses resonant with the transitions between the three lower levels $|0\rangle_k, |1\rangle_k, |2\rangle_k$ and the upper level $|4\rangle_k$. In such a case, all of the physical processes in the quantum computing method of the present invention are based on the adiabatic passage. The adiabatic passage has the advantage of the abilities to neglect relaxation of the exited state and to be robust to errors in physical quantities to be controlled. Therefore, the fact that all of the calculations can be done using only the adiabatic passage is one of the advantages of the present invention.

To execute the 1-qubit gate of $|d\rangle_1 \to e^{i[\Theta_3+\phi_3/2]}|d\rangle_1$ on the control bit 1, the control system 1 is irradiated with light pulses resonant with the transitions between $|0\rangle_k, |1\rangle_k, |2\rangle_k$ and $|4\rangle_k$. Let the frequencies of the light pulses be $\omega_{04}^{(1)}$, $\omega_{14}^{(1)}$, and $\omega_{24}^{(1)}$, respectively. The electric field of the light pulse trains is expressed by the following equation:

$$E''^{(1)}(t) = \sum_{l=0,1,2} E_l''^{(1)}(t)\exp[-i\omega_{l4}^{(1)}t] + c.c..$$

The envelopes are given by the following equations:

$$E_0'''^{(1)}(t) = A'''^{(1)} \cos\frac{\theta_1}{2} f_c''(t),$$

$$E_1'''^{(1)}(t) = A'''^{(1)} e^{-i\varphi_1} \sin\frac{\theta_1}{2} f_c''(t),$$

$$E_2'''^{(1)}(t) = A'''^{(1)} [f_2''(t) + e^{i(\Theta_3 + \phi_3/2)} f_2'''(t)],$$

where $A'''^{(1)}$ is a constant and the pulse waveforms are given by the following equations:

$$f_c''(t) = \exp\left[-\frac{(t - 20\tau - t_0)^2}{\tau^2}\right] + \exp\left[-\frac{(t - 24\tau - t_0)^2}{\tau^2}\right],$$

$$f_2''(t) = \exp\left[-\frac{(t - 19\tau - t_0)^2}{\tau^2}\right], f_2''' \exp\left[-\frac{(t - 25\tau - t_0)^2}{\tau^2}\right]$$

Next, the case of a multi-control unitary gate with an N number of control bits (N is a natural number) will be described. Let the first to the N-th qubit be control bits and the (N+1)-th qubit be a target bit. In step 1, the transformation $|c\rangle_{N+1} \to -|2\rangle_{N+1}$ is performed as in the M-C-U gate described above. In the present case, the Hamiltonian in step 2 is given by the following equation:

$$H' = \sum_{k=1}^{N+1} \hbar(\Omega_c'^{(k)}(t)|3\rangle_{kk}\langle c| + ga|3\rangle_{kk}\langle 2|) + H.c..$$

The dark states depending on time are expressed as follows:

$$|D_1(t)\rangle \propto \Omega_c'^{(1)} \Omega_c'^{(2)} \ldots \Omega_c'^{(N+1)} \exp\left[-\sum_{k=1}^{N+1} \frac{|c\rangle_{kk}\langle 2|}{\Omega_c'^{(k)}} ga\right]|22\ldots 2\rangle|N\rangle,$$

$$|D_2(t)\rangle \propto \Omega_c'^{(2)} \ldots \Omega_c'^{(N+1)} \exp\left[-\sum_{k=2}^{N+1} \frac{|c\rangle_{kk}\langle 2|}{\Omega_c'^{(k)}} ga\right]|d2\ldots 2\rangle|N-1\rangle, \ldots$$

$$|D_3(t)\rangle \propto \Omega_c'^{(1)} \ldots \Omega_c'^{(N)} \exp\left[-\sum_{k=1}^{N} \frac{|c\rangle_{kk}\langle 2|}{\Omega_c'^{(k)}} ga\right]|22\ldots d\rangle|N\rangle, \ldots$$

Of the states after step 1, the states in each of which the target bit is $|2\rangle$ and at least one of the control bits is $|c\rangle$ are included in the above dark states and are changed by adiabatic passage. From the above equations, it is found that the coefficients of those states in the dark states are $g^k \Omega_c'^{(N+1)}$ (k= 1, . . . , N). Since Rabi frequency $\omega_c'^{(N+1)}$ is transformed into $e^{i\phi(N+1)} \omega_c'^{(N+1)}$ in the adiabatic passage in step 2, the coefficient in each of these states is multiplied by $e^{i\phi(N+1)}$. Of the states after step 1, the state in which all of the control bits are $|d\rangle$ is a dark state independent of time and, therefore, does not change. The remaining states, i.e., the states in each of which the target bit is $|d\rangle$ and at least one of the control bits is $|c\rangle$, are included in the above dark states. However, each of their coefficients is a power of only g and is independent of time, and thus they are not changed by the adiabatic passage in step 2. If in step 3, the transformation $-|2\rangle_{N+1} \to e^{-i\phi(N+1)}|c\rangle_{N+1}$ is performed as in the M-C-U gate described above, it results in the state in which the target bit is multiplied by $e^{-i(\Theta(N+1)+\phi(N+1)/2)}U_3$ only when all of the control bits are $|d\rangle$.

Therefore, it turns out that an M-C-U gate with an N number of control bits can be realized by the above three steps except for a phase factor.

To execute the M-C-U gate properly, including the phase, in the case when $\Theta_{N+1} + \phi_{N+1}/2 \neq 0$ and the number of control bits is N (N is a natural number equal to 2 or more), the M-C-U gate described above is executed and then an M-C-U gate using the control bit 1 as a target bit and the remaining (N−1) control bits as control bits is similarly executed to perform a transformation $|d\rangle_1 |d\rangle_2 \ldots |d\rangle_N \to e^{i[\Theta(N+1)+\phi(N+1/2)]}|d\rangle_1 |d\rangle_2 \ldots |d\rangle_N$, while the rest are unchanged.

As described above, on an N number of control bits and a single target bit, an M-C-U gate which performs a unitary transformation U to the target bit only when control bits are in $|d\rangle$, which are superposition states of $|0\rangle$ and $|1\rangle$, and need not be the same from one control bit to another, can be realized except for a phase factor by performing adiabatic passage three times.

EMBODIMENTS

Embodiments of the present invention will be described hereinafter.

First Embodiment

FIG. 5 is a schematic view showing the configuration of the quantum computer according to the first embodiment of the present invention. A $Pr^{3+}$-doped $Y_2SiO_5$ crystal ($Pr^{3+}:Y_2SiO_5$ crystal) is used as a sample 20. The hyperfine levels of $Pr^{3+}$ are used for physical systems. FIG. 6 is a schematic view showing the hyperfine levels of $Pr^{3+}$. Their hyperfine structure splitting is due to the nuclear spin of $Pr^{3+}$ and a very long coherence time can be realized at low temperature. It has been verified that coherent superposition states can be realized in this material using laser (K. Ichimura, K. Yamamoto, and N. Gemma, Phys. Rev. A 58, 4116, 1998). The hyperfine levels of $Pr^{3+}$ are best suited to a quantum computing method of the present invention using three lower levels and two upper levels.

Since each level is degenerate in terms of the nuclear spin, if ions with suitable energy levels do not exist, the Zeeman levels adjusted by an external magnetic field can be used (see the second embodiment). In addition, desired energy levels may be prepared by applying an electric field to ions, depending on the physical systems used.

A ring dye laser having frequency jitter stabilized up to several kilohertz is used as a light source 10. Since light pulse trains necessary for the quantum computing method of the present invention can be realized by frequency shift, intensity modulation, and phase modulation, acousto-optic modulators (AOMs) 11 and electro-optic modulators (EOMs) 12 are used to produce the pulse trains. To make it possible to set suitably the amplitude of a light pulse at the AOMs 11 and its phase at the EOMs 12, a control system 15 making the AOMs 11 and EOMs 12 to operate in synchronization with one another is used.

The sample 20 ($Pr^{3+}:Y_2SiO_5$ crystal), which is relatively small (1×1×1 mm), is fixed at the focal point of a Fabry-Perot cavity 21 and is placed in a cryostat 13 together with the cavity 21. The inside of the cryostat 13 is kept at absolute temperature of 1.4K by use of liquid helium.

In reading the result of calculations after the completion of the quantum computation, to detect emission from the ions irradiated with light resonant with a level, a highly sensitive photodetector 14 is placed outside the cryostat 13.

The operation of the quantum Toffoli gate using the apparatus of FIG. 5 will be described. The quantum Toffoli gate is a gate which exchanges |0> and |1> in the target bit only when both of the control bit 1 and control bit 2 are |1>.

First, suitable ions for gate operations are selected. A sample whose $Pr^{3+}$ concentration is sufficiently low is used and is operated in a frequency band departing from the center of the inhomogeneous broadening, thereby making only several ions resonant with the cavity. Of these ions, three ions having the levels shown in FIG. 7 are used. Let two levels resonant with the cavity mode be $|2>_k$, $|3>_k$ (k=1, 2, 3). Of the remaining levels, two lower levels are denoted by $|0>_k$, $|1>_k$, and one upper level is denoted by $|4>_k$. While ions have been selected so that hyperfine levels of different nuclear spins are used as the lower levels resonant with the cavity as shown in FIG. 7 in order to make it easier to distinguish the ions by frequency, these ions can also be selected in the inhomogeneous broadening of the hyperfine levels of the same nuclear spin.

Next, a suitable initial state is prepared. The sample is irradiated with light resonant with transitions between $|2>_k$ (k=1, 2, 3) and the upper levels other than $|3>_k$ and $|4>_k$ in order to transfer the state of the lower levels resonant with the cavity mode of all of the ions to lower levels unresonant with the cavity mode. While the sample is irradiated with the light resonant with $|2>_k$ (k=1, 2, 3), the sample is also irradiated with light resonant with the transitions between $|1>_1$ and $|4>_1$, between $|1>_2$ and $|4>_2$ and between $|1>_3$ and $|4>_3$ so as to transfer the states of the three ions to $|0>_1|0>_2|0>_3$. Initialization is achieved in this way. Similarly, the states of the three ions can be set to $|1>_1|0>_2|0>_3$ or $|0>_1|1>_2|0>_3$ or $|1>_1|1>_2|0>_3$. Hereinafter, the quantum Toffoli gate is executed when the initial state is each of the four cases: ($|0>_1$, $|0>_2$, $|0>_3$), ($|1>_1$, $|0>_2$, $|0>_3$), ($|0>_1$, $|1>_2$, $|0>_3$), ($|1>_1$, $|1>_2$, $|0>_3$). Thereafter, measurements are made to verify whether the operation has been performed properly or not. If the state of qubit 3 becomes $|1>_3$ only when the initial state is ($|1>_1$, $|1>_2$, $|0>_3$) and remains at $|0>_3$ in other cases, this means that the proper operation has been performed.

A specific operation to execute the quantum Toffoli gate will be described. In comparison of the quantum Toffoli gate with the aforementioned general M-C-U gate, since the states $|d>_1$, $|c>_1$, $|d>_2$ and $|c>_2$ and the unitary transformation $U_3$ used in the M-C-U gate correspond to the states $|1>_1$, $|0>_1$, $|1>_2$ and $|0>_2$ and the transformation $\sigma_x^{(3)}$, respectively, in the quantum Toffoli gate, the values of the parameters that determine pulse trains to be applied are as follows:

$$\phi_3=\Pi, \phi_1=\phi_2=\phi_3=\Pi, \theta_1=\phi_2=0, \theta_3=\Pi/2, \Theta_3=-\Pi/2.$$

This gives:

$$|d>_3=(|0>+|1>)*2^{-1/2}, |c>_3=(|0>-|1>)*2^{-1/2}.$$

Figure 8:
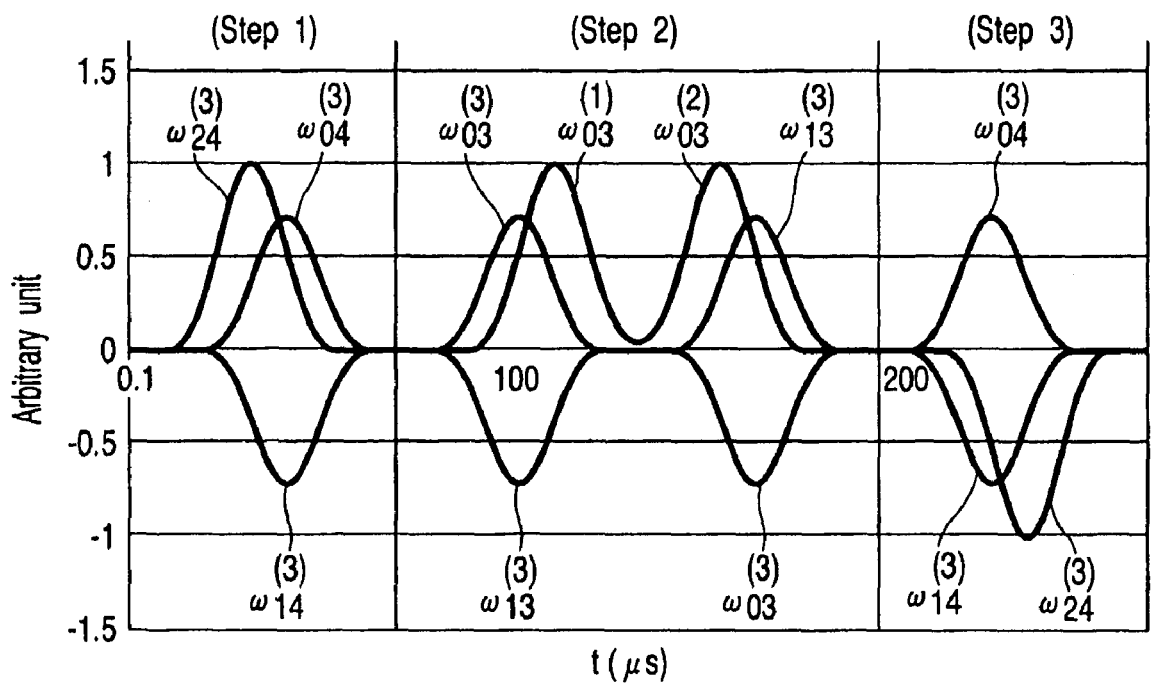
FIG. 8 is a waveform chart showing the envelopes of the light pulse trains used to realize the quantum Toffoli gate in the first embodiment.

Hereinafter, the case in which the initial state is $|\Psi_0>=|000>|0>=(|00d>+|00c>)*2^{-1/2}|0>$ will be described in detail. The process of executing the Toffoli gate includes three steps as in the aforementioned general M-C-U gate. FIG. 8 shows the envelopes of light pulses used in the three steps. In FIG. 8, all of the constant factors appearing in the equations below have been set to 1.

(Step 1)

First, the sample is irradiated with light pulse trains resonant with the transitions between $|0>_3$ and $|4>_3$, between $|1>_3$ and $|4>_3$ and between $|2>_3$ and $|4>_3$. The electric field of the pulse train acting on the physical system 3 is determined by the above parameters and is expressed by the following equation:

$$E(t) = \sum_{l=0,1,2} E_l^{(3)}(t)\exp[i\omega_{l4}^{(3)} t] + c.c.$$

(c.c.: complex conjugate)

The envelopes (see FIG. 8) are given by the following equation:

$$E_0^{(3)} = A^{(3)} \frac{1}{\sqrt{2}} f_c(t), \; E_1^{(3)} = -A^{(3)} \frac{1}{\sqrt{2}} f_c(t), \; E_2^{(3)} = -A^{(3)} f_2(t),$$

where $A^{(3)}$ is a constant; $f_c(t)$ and $f_2(t)$ represent pulse waveforms and are given by the following equations:

$$f_c(t) = \exp\left[-\frac{(t-\tau-t_0)^2}{\tau^2}\right], \; f_2(t) = \exp\left[-\frac{(t-t_0)^2}{\tau^2}\right].$$

In this embodiment, $\tau$ and $t_0$ are set as follows: $\tau=10$ µS and $t_0=30$ µS. The interaction Hamiltonian in interaction representation is expressed by the following equation under rotating-wave approximation:

$$H = \sum_{l=c,2} \hbar \Omega_l^{(3)}(t)|4>_{33}\langle l| + \sum_{k=1,2,3} \hbar g a |3>_{kk}\langle 2| + H.c.$$

(H.c. is Hermitian conjugate), where $$\Omega_l^{(3)}(t) = \frac{dA^{(3)}}{\hbar} f_l(t)$$

is the Rabi frequency (d is a transition dipole moment), g is a coupling constant between the physical system and the cavity mode, and a is an annihilation operator for cavity photons.

The dark states for the Hamiltonian, i.e., the eigenstates corresponding to the Hamiltonian zero eigenvalue, related to the initial state are $|1>_1|m>_2|d>_3|0>$ and $|1>_1|m>_2(\Omega_2^{(3)}(t)|c>_3-\Omega_c^{(3)}(t)|2>_3)|0>$ (l, m=0, 1). When the change of the Rabi frequencies is sufficiently slow, the state $|c>_3$ in the initial states is changed by the light pulse trains according to the change of the dark state. The remaining states do not change. Since the dark state is $|c>_3$ when the light pulses resonant with $|2>_3$ starts to be applied, $|c>_3$ does not change. Since the dark state is the superposition of $|c>_3$ and $|2>_3$ while the light pulses resonant with the state $|c>_3$ are applied, $|c>_3$ in the initial state also changes to the same superposition state. When the application of the light pulse train is completed, $|c>_3$ eventually becomes $-|2>_3$ as a result of the change of the dark state (adiabatic passage). The state after the adiabatic passage is expressed as $$|\Psi_1>=(|00d>-|002>)*2^{-1/2}|0>.$$

(Step 2)

Next, adiabatic passage is performed using a cavity effect. The sample is irradiated with light pulse trains resonant with the transitions between $|0>_1$ and $|3>_1$, between $|0>_2$ and $|3>_2$, between $|0>_3$ and $|3>_3$, and between $|1>_3$ and $|3>_3$. Let the frequencies of the light pulse trains be $\omega_{03}^{(1)}$, $\omega_{03}^{(2)}$, $\omega_{03}^{(3)}$, and $\omega_{13}^{(3)}$ respectively. The electric field $E'(k)(t)$ of the pulse train acting on physical system k (k=1, 2, 3) is expressed by the following equation:

$$E'^{(k)}(t) = \sum_{l=0,1} E_l'^{(k)}(t)\exp[-i\omega_{l3}^{(k)}t] + c.c..$$

The envelopes are given by the following equations:

$$E_0'^{(1)}(t) = A'^{(1)}f^{(1)}(t), E_1'^{(1)}(t) = 0,$$
$$E_0'^{(2)}(t) = A'^{(2)}f^{(2)}(t), E_1'^{(2)}(t) = 0,$$
$$E_0'^{(3)}(t) = A'^{(3)}\frac{1}{\sqrt{2}}[f_1^{(3)}(t) - f_2^{(3)}(t)],$$
$$E_1'^{(3)}(t) = -A'^{(3)}\frac{1}{\sqrt{2}}f^{(3)}(t)[f_1^{(3)}(t) - f_2^{(3)}(t)],$$

where $A'^{(k)}$ (k=1, 2, 3) is a constant and the pulse waveforms $f^{(k)}(t)$ (k=1, 2, 3) are given by the following equations:

$$f^{(1)}(t) = f^{(2)}(t)$$
$$= \exp\left[-\frac{(t-8\tau-t_0)^2}{\tau^2}\right] + \exp\left[-\frac{(t-12\tau-t_0)^2}{\tau^2}\right],$$
$$f_1^{(3)}(t) = \exp\left[-\frac{(t-7\tau-t_0)^2}{\tau^2}\right], f_2^{(3)} = \exp\left[-\frac{(t-13\tau-t_0)^2}{\tau^2}\right]$$

The interaction Hamiltonian is expressed by the following equation:

$$H' = \sum_{k=1,2} \hbar(\Omega_0'^{(k)}(t)|3\rangle_{kk}\langle 0| + ga|3\rangle_{kk}\langle 2|) +$$
$$\hbar(\Omega_c'^{(3)}(t)|3\rangle_{33}\langle c| + ga|3\rangle_{33}\langle 2|) + H.c.,$$

where the Rabi frequencies are $$\Omega_0'^{(k)}(t) = \frac{dA'^{(k)}}{\hbar}f^{(k)}(t)(k=1,2) \text{ and}$$
$$\Omega_c'^{(3)}(t) = \frac{dA'^{(3)}}{\hbar}[f_1^{(3)}(t) - f_2^{(3)}(t)].$$

The dark states related to the change of the states are expressed by the following equations:

$$|D_5(t)\rangle \propto \sqrt{2}g^2|00d\rangle|0\rangle -$$
$$\sqrt{2}g(\Omega_c'^{(1)}(t)|2cd\rangle + \Omega_c'^{(2)}(t)|c2d\rangle)|1\rangle + \Omega_c'^{(1)}(t)\Omega_c'^{(2)}(t)|22d\rangle|2\rangle,$$
$$|D_8(t)\rangle \propto \sqrt{2}g^2(\Omega_c'^{(3)}(t)|002\rangle + \Omega_c'^{(1)}(t)|2cc\rangle + \Omega_c'^{(2)}(t)|c2c\rangle)|0\rangle -$$
$$\sqrt{2}g(\Omega_c'^{(1)}(t)\Omega_c'^{(2)}(t)|22c\rangle + \Omega_c'^{(1)}(t)\Omega_c'^{(3)}(t)|2c2\rangle + \Omega_c'^{(2)}(t)\Omega_c'^{(3)}(t)|c22\rangle)$$
$$|1\rangle + \Omega_c'^{(1)}(t)\Omega_c'^{(2)}(t)\Omega_c'^{(3)}(t)|222\rangle|2\rangle$$

Since the sign of $\Omega_c'^{(3)}$ is reversed in this step, the state is changed to $|\Psi_2\rangle = (|00d\rangle + |002\rangle) * 2^{-1/2}|0\rangle$.

(Step 3)

The reverse operation to the adiabatic passage in step 1 is performed to return the state $-|2\rangle_3$ to $-|c\rangle_3$. What differs from step 1 is that the envelope and the light pulse waveforms are expressed as shown below. The constant $A^{(3)}$ need not be the same as that in step 1.

$$E_0^{(3)} = A^{(3)}\frac{1}{\sqrt{2}}f_c(t), E_1^{(3)} = -A^{(3)}\frac{1}{\sqrt{2}}f_c(t), E_2^{(3)} = -A^{(3)}f_2(t),$$
$$f_c(t) = \exp\left[-\frac{(t-19\tau-t_0)^2}{\tau^2}\right], f_2(t) = \exp\left[-\frac{(t-20\tau-t_0)^2}{\tau^2}\right].$$

The state becomes $|\Psi_3\rangle = (|00d\rangle + |00c\rangle) * 2^{-1/2}|0\rangle = |000\rangle|\rangle = |\Psi_0\rangle$. That is, if the initial state is $|000\rangle|0\rangle$, the state returns to the initial through the above three steps and remains unchanged.

If the initial state is $|\Psi_0\rangle = |100\rangle|0\rangle = (|10d\rangle + |10c\rangle) * 2^{-1/2}|0\rangle$, when the sample is irradiated with the pulse trains of FIG. 8, the states in the three steps are $|\Psi_1\rangle = (|10d\rangle - |102\rangle) * 2^{-1/2}|0\rangle$, $|\Psi_2\rangle = (|10d\rangle + |102\rangle) * 2^{-1/2}|0\rangle$, and $|\Psi_3\rangle = (|10d\rangle + |10c\rangle) * 2^{-1/2}|0\rangle = |100\rangle|0\rangle$, respectively. That is, the state returns to the initial state through the three steps and remains unchanged. Similarly, if the initial state is $|\Psi_0\rangle = |010\rangle|0\rangle = (|01d\rangle + |01c\rangle) * 2^{-1/2}|0\rangle$, when the sample is irradiated with the pulse trains of FIG. 8, the state returns to the initial state through the three steps and remains unchanged.

If the initial state is $|\Psi_0\rangle = |110\rangle|0\rangle = (|11d\rangle + |11c\rangle) * 2^{-1/2}|0\rangle$, when the sample is irradiated with the pulse trains of FIG. 8, the states in the three steps are $|\Psi_1\rangle = (|11d\rangle - |112\rangle) * 2^{-1/2}|0\rangle$, $|\Psi_2\rangle = (|11d\rangle + |112\rangle) * 2^{1/2}|0\rangle$, and $|\Psi_3\rangle = (|11d\rangle + |11c\rangle) * 2^{-1/2}|0\rangle = |111\rangle|0\rangle$, respectively, which means qubit 3 is flipped.

Since the above operation coincide with the operation of a Toffoli gate, the pulse trains of FIG. 8 can realize the Toffoli gate.

Using the AOMs 11 and the EOMs 12, pulse trains with the envelopes of FIG. 8 were generated and applied to the sample after initialization. The intensities of the light pulses were set so that the Rabi frequencies are several MHz at its peak. Immediately after that, the sample is irradiated with the light pulses resonant with the transition between $|1\rangle_3$ and $|4\rangle_3$ and emission from the sample was detected by the photodetector 14. Such measurements were made repeatedly. When the initial state was $(|0\rangle_1, |0\rangle_2, |0\rangle_3)$, $(|1\rangle_1, |0\rangle_2, |0\rangle_3)$ or $(|0\rangle_1, |1\rangle_2, |0\rangle_3)$, little emission was observed. On the other hand, when the initial state was $(|1\rangle_1, |1\rangle_2, |0\rangle_3)$, emission was observed. This means that the gate operated properly.

Second Embodiment

Figure 9:
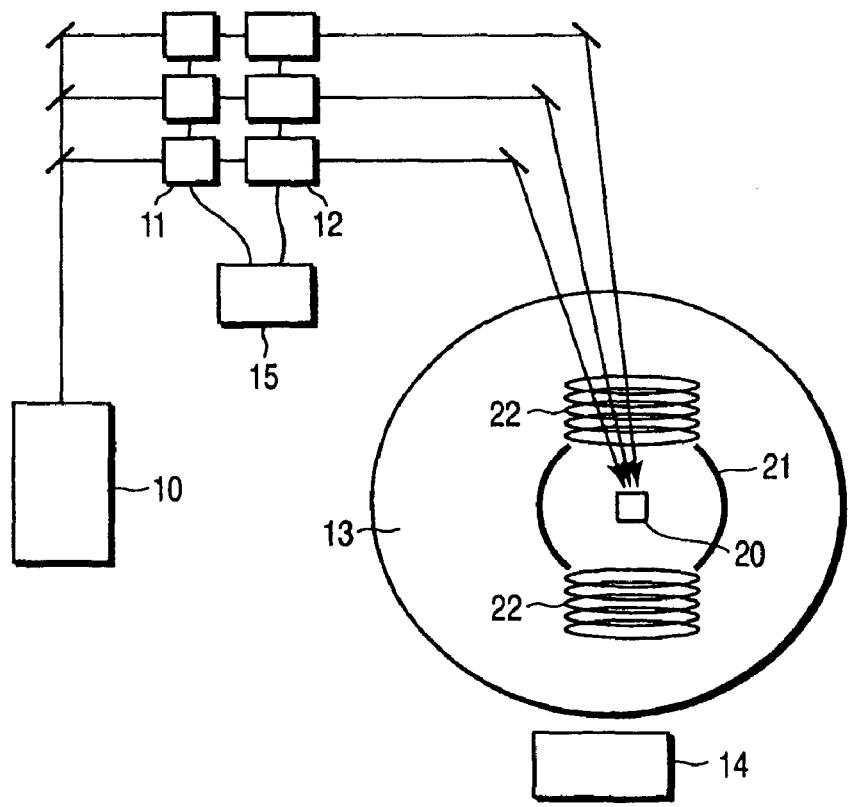
FIG. 9 is a schematic view showing the configuration of the quantum computer used in the second embodiment of the present invention.

In this embodiment, the case in which a magnetic field is applied to the physical systems in order to set energy levels will be described. FIG. 9 is a schematic view showing the configuration of the quantum computer according to the second embodiment. In the apparatus of FIG. 9, coils 22 for applying a magnetic field to the sample 20 is provided in addition to the apparatus of FIG. 5 used in the first embodiment.

To verify that suitable energy levels can be set by applying a magnetic field to the sample 20, experiments were conducted in a frequency band separated from the frequency band used in the first embodiment by the free spectral range (FSR) of the cavity. In this case, three ions having desirable energy levels as shown in FIG. 7 did not exist. When examinations were made by changing the intensity of the applied magnetic field, three ions were found at a magnetic field of several hundreds of gauss which had energy levels of the transition frequency equal to the resonant frequency of the cavity as shown in FIG. 7. When a quantum Toffoli gate was executed for the three ions in the same manner as in the first embodiment, it was verified that the gate operated properly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum computing method capable of executing multiqubit-controlled unitary gates, in each of which a unitary transformation U is performed to a single target bit depending on an N number of control bits (N is a natural number), the quantum computing method comprising:

providing an (N+1) number of physical systems in an optical cavity, each of the (N+1) number of physical systems having five energy levels $|0\rangle$, $|1\rangle$, $|2\rangle$, $|3\rangle$, and $|4\rangle$, a qubit being expressed by two levels, $|0\rangle$ and $|1\rangle$, of the three lower levels, transitions between each of the three lower levels $|0\rangle$, $|1\rangle$, and $|2\rangle$ and each of the two upper levels $|3\rangle$ and $|4\rangle$ being optically allowed, and a transition frequency between two levels $|2\rangle$ and $|3\rangle$ in each of the physical systems being equal to one another, the optical cavity having a cavity mode resonant with the transition frequency between two levels $|2\rangle$ and $|3\rangle$, such that an N number of physical systems among the (N+1) number of physical systems are used as an N number of control systems and the one other physical system as a target system;

irradiating the target system with light pulses resonant with the transitions between $|0\rangle$ and $|4\rangle$, between $|1\rangle$ and $|4\rangle$, and between $|2\rangle$ and $|4\rangle$ so as to change a superposed state, $|c\rangle$, of $|0\rangle$ and $|1\rangle$ dependent on the unitary transformation U to the state $|2\rangle$ in the target system;

irradiating all of the (N+1) number of systems with light pulses resonant with the transitions between $|0\rangle$ and $|3\rangle$, and between $|1\rangle$ and $|3\rangle$, and shifting a phase of the light pulse resonant with the target system by a specific value dependent on the unitary transformation U while the control systems are irradiated with the resonant light pulses; and irradiating the target system with light pulses resonant with the transitions between $|0\rangle$ and $|4\rangle$, between $|1\rangle$ and $|4\rangle$, and between $|2\rangle$ and $|4\rangle$, with a phase difference between them being set to a specific value dependent on the unitary transformation U, so as to return the state $|2\rangle$ to the state $|c\rangle$.

2. The quantum computing method according to claim 1, wherein the five energy levels are hyperfine structure levels due to nuclear spin of atoms or ions.

3. The quantum computing method according to claim 1, wherein the five energy levels are set using energy level splitting with application of a magnetic field or an electric field to atoms or ions.

4. The quantum computing method according to claim 1, wherein a 1-qubit gate is executed by applying the light pulses resonant with the transitions between $|0\rangle$ and $|4\rangle$, between $|1\rangle$ and $|4\rangle$, and between $|2\rangle$ and $|4\rangle$, and by controlling their intensities and phases.

* * * * *